(12) United States Patent
Devillard et al.

(10) Patent No.: US 10,419,503 B1
(45) Date of Patent: Sep. 17, 2019

(54) DYNAMIC DATA TAILING

(71) Applicant: Amazon Technologies, Inc., Reno, NV (US)

(72) Inventors: Emmanuel Pierre Devillard, Issaquah, WA (US); Wei Huang, Shoreline, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 162 days.

(21) Appl. No.: 15/587,257

(22) Filed: May 4, 2017

(51) Int. Cl.
*G06F 15/16* (2006.01)
*H04L 29/06* (2006.01)
*H04L 29/08* (2006.01)

(52) U.S. Cl.
CPC ...... *H04L 65/4069* (2013.01); *H04L 67/2842* (2013.01); *H04L 67/10* (2013.01)

(58) Field of Classification Search
USPC ........................................ 709/219, 203, 231
See application file for complete search history.

*Primary Examiner* — Lan Dai T Truong
(74) *Attorney, Agent, or Firm* — Hogan Lovells US LLP

(57) ABSTRACT

A near real time data tailing mechanism can enable data, received on a stream, to be directed to a specified location independent of any processing and persistent storage of that data. A customer can submit a tail request that can be received to a front end of a data management service. When a request is received to store data to the persistent storage, a determination is made that the front end has registered a tail for that data stream and the host receiving the data can forward a copy of the data to the front end, which can cause the data to be transmitted to the specified location. One or more filters can be applied in order to cause only specific data to be transmitted for the tail request. A best effort approach provides an overview of the data in near real time.

20 Claims, 7 Drawing Sheets

DYNAMIC DATA TAILING

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. In some instances, applications can stream data from multiple sources that can be received to, and stored by, some of these resources. If a user wants to be able to read the data that is received to the cloud resources, the data must be located that was first processed and stored by the resources. Such an approach comes with an amount of cost and latency that may be impractical or unmanageable for certain applications that need to consume that data.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in conventional approaches to managing data in a network environment. In particular, various embodiments provide an efficient, near real time data tailing mechanism. Generally speaking, a tail request or tailing may refer to, for example, a request to receive a copy of each instance of data shortly after that instance is received to a specified destination, such as an endpoint. Data received on various data streams can be processed and stored to persistent storage. In order to enable this data to be tailed without excessive cost or delay, a customer or other entity can submit a tail request that can be received to a front end or endpoint of a data management service, which can function as a handler for the tail data with respect to that data stream. When a request is received to store data to persistent storage corresponding to a tailed stream, a determination can be made that a handler has registered a tail for that data stream. The front end receiving the data can then forward a copy of the data to the data stream handler, which can forward the data to a specified location. Any processing of the data can still be applied, but the tail data will be transmitted independent of this processing. One or more filters can also be applied in order to cause only specific data to be transmitted for the tail request.

Various other such functions can be used as well within the scope of the various embodiments as would be apparent to one of ordinary skill in the art in light of the teachings and suggestions contained herein.

Figure 1A:
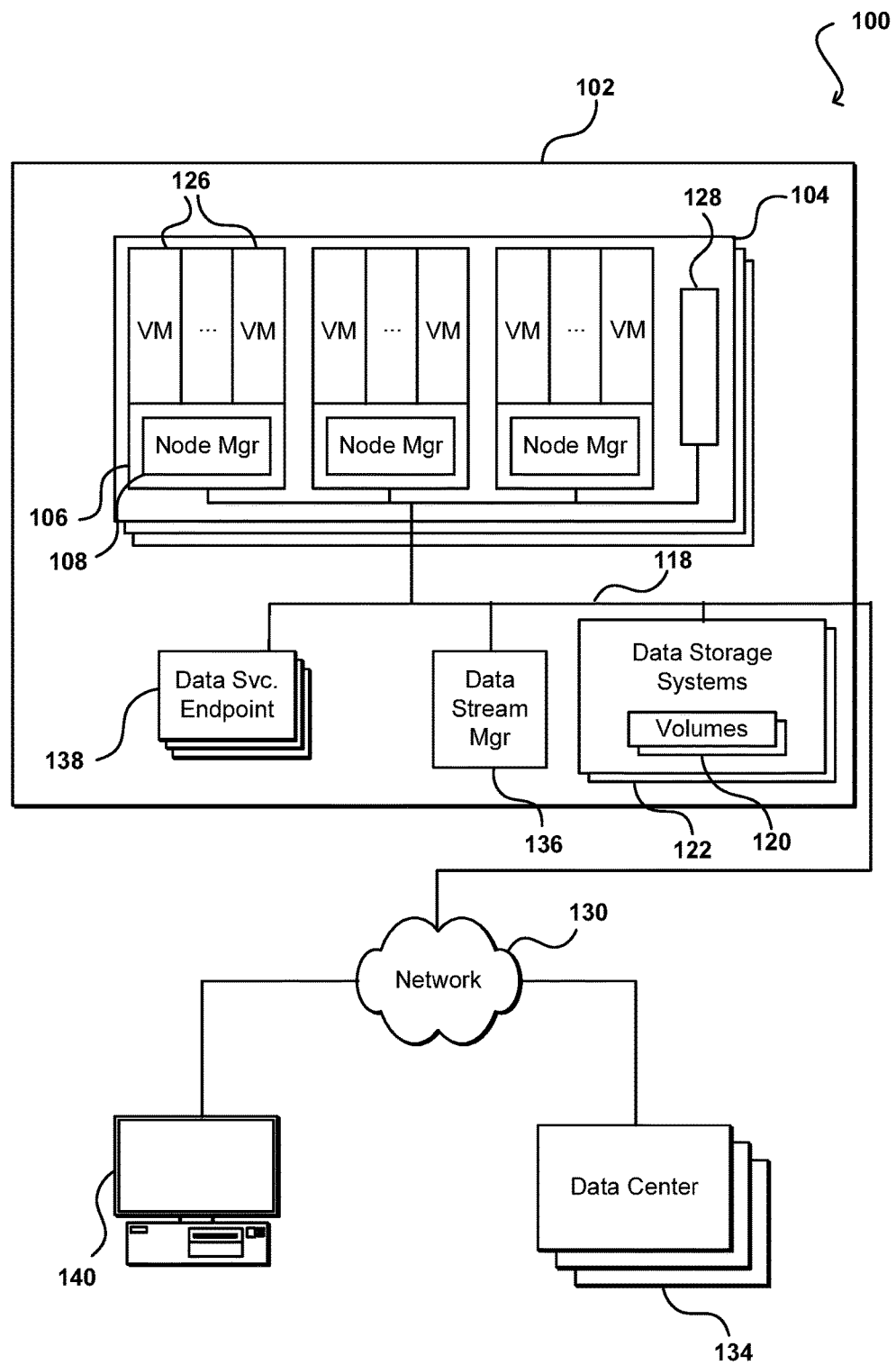
FIGS. 1A and 1B illustrate an example environment in which aspects of the various embodiments can be implemented.
Figure 1B:
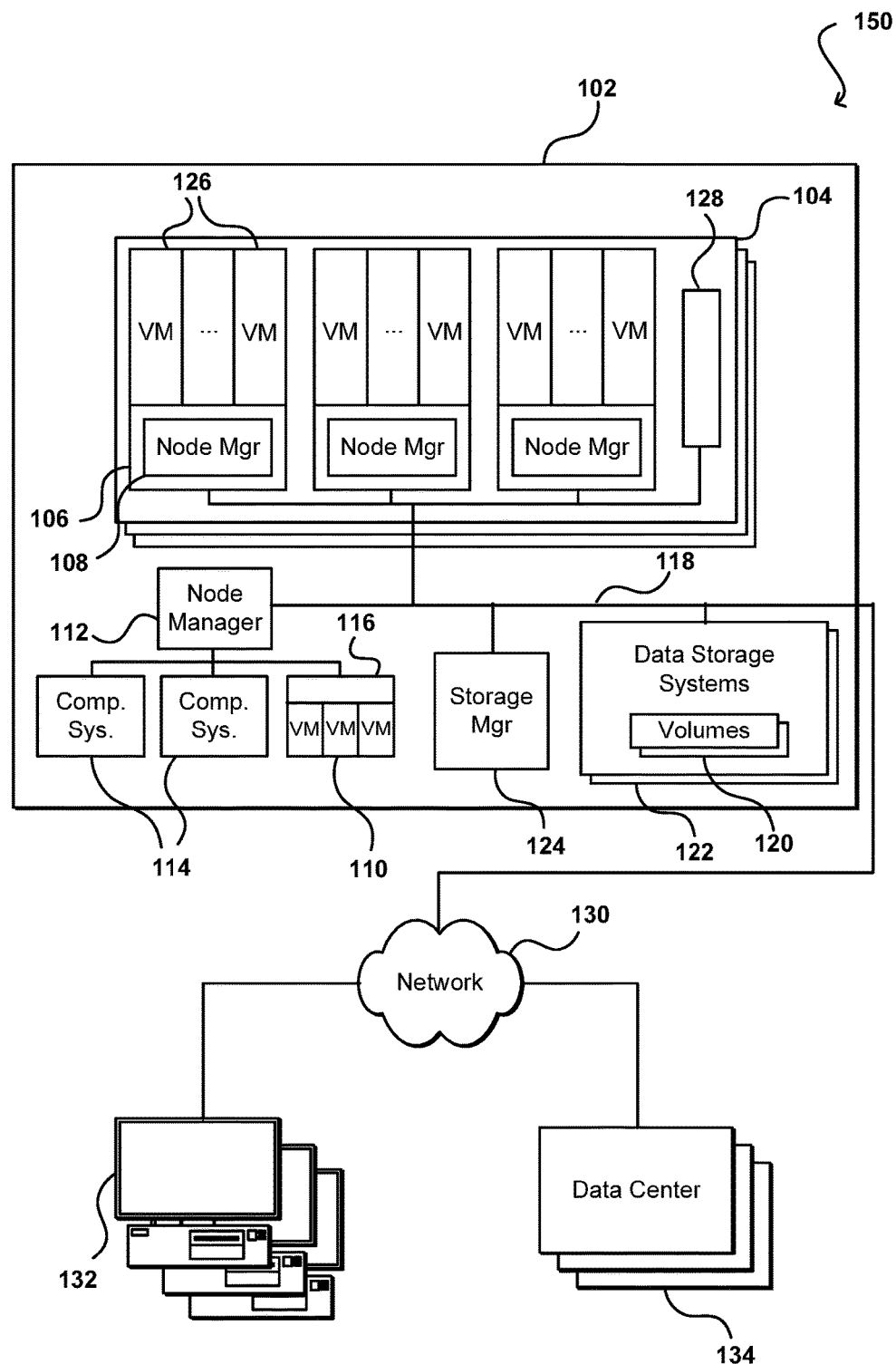

FIGS. 1A and 1B illustrate views 100, 150 of an example network configuration in which computing and data access operations can be performed, along with other such functionality, in accordance with various embodiments. This configuration can include components offered as part of a multi-tenant environment, or resource provider environment 102, wherein the components are provided by a resource provider, and customers pay for access and/or utilization of respective portions of those resources. Various resources, such as servers or host computing systems 106, can provide streams of data that can be stored to various storage volumes 120. The data for the various data streams can be received to a set of data service endpoints 138, and aggregated into a single stream using a data stream manager 136 or other such service. A client device 140 associated with a customer can submit a request to receive a copy of the data received to the endpoints 138 for a specified stream.

In this example configuration, the resource provider environment includes a number of racks 104, each rack including a number of host computing devices 106. The host computing systems 106 each host one or more virtual machines. Each virtual machine can act as an independent resource node for executing one or more program copies or performing another such action or process for user data requests, I/O operations, etc. This example configuration also includes computer systems that execute a data storage system or service. The service can utilize a pool of multiple data storage systems, which each have local storage for use in storing one or more volumes 110. Access to the volume copies 110 is provided over an internal network to programs executing on various resource nodes. Thus, an application executing on a virtual machine instance on one of the computer systems 106 can be connected with one or more storage volumes 110 in the data storage systems. This is referred to herein as the instance being "attached" to the storage volume(s). In this example configuration, multiple computing systems are operable to execute various programs, applications, and/or services, and further operable to access reliable data storage, such as under the control of a data storage service. A data storage service can use multiple data storage systems in a data center, for example, to provide reliable, non-local data storage to executing programs or various other components, systems, or services. Multiple remote archival storage systems external to the data center may also be used to store additional copies of at least some portions of at least some data storage volumes.

In this example, a data center 102 includes a number of racks 104, each rack including a number of host computing devices 106, as well as an optional rack support computing system 128 in this example embodiment. The host computing systems 106 on the illustrated rack 104 each host one or more virtual machines 126 in this example, as well as a distinct node manager module 112 associated with the virtual machines on that host computing system to manage those virtual machines. One or more other host computing systems 116 may also each host one or more virtual machines 110 in this example. Each virtual machine 110 may act as an independent resource node for executing one or more program copies or performing another such action or process for user data requests, I/O operations, etc. In addition, this example data center 102 further includes additional host computing systems 114 that do not include distinct virtual machines, but may nonetheless each act as a resource node for one or more tasks being executed for a user. In this example, a node manager module 112 executing on a computing system (not shown) distinct from the host computing systems 114 and 116 is associated with those host computing systems to manage the resource nodes provided by those host computing systems, such as in a manner similar to the node manager modules 108 for the host computing systems 106. The rack support computing system 128 may provide various utility services for other computing systems local to its rack 104 (e.g., long-term program storage, metering, and other monitoring of program execution and/or of non-local data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 102 also includes a computing system 124 that executes a storage system manager module (such as for block-based storage) for the data storage service to assist in managing the availability of non-local data storage to programs executing on resource nodes provided by the host computing systems located within the data center (or optionally on computing systems located in one or more other data centers 134, or other remote computing systems 132 external to the data center). In particular, in this example the data center 102 includes a pool of multiple data storage systems 122, which each have local storage for use in storing one or more volume copies 120. Access to the volume copies 120 is provided over the internal network(s) 118 to programs executing on various resource nodes 110 and 114. As discussed in greater detail elsewhere, a data storage system manager module 124 may provide a variety of services related to providing non-local data storage functionality, including the management of user accounts (e.g., creation, deletion, billing, etc.); the creation, use and deletion of data storage volumes and snapshot copies of those volumes; the collection and processing of performance and auditing data related to the use of data storage volumes and snapshot copies of those volumes; the obtaining of payment from customers or other users for the use of data storage volumes and snapshot copies of those volumes; etc. In some embodiments, the storage system manager module 122 may coordinate with the node manager modules 112, 108 to manage use of volumes by programs executing on associated resource nodes, while in other embodiments the node manager modules may not be used to manage such volume use. In addition, in other embodiments, one or more storage system manager modules 124 may be structured in other manners, such as to have multiple instances of the storage system manager executing in a single data center (e.g., to share the management of non-local data storage by programs executing on the resource nodes provided by the host computing systems located within the data center), and/or such as to have at least some of the functionality of a storage system manager module being provided in a distributed manner by software executing on some or all of the server data storage systems 122 (e.g., in a peer-to-peer manner, without any separate centralized storage system manager module on a computing system 124).

In this example, the various host computing systems, server data storage systems, and computing systems are interconnected via one or more internal networks 118 of the data center, which may include various networking devices (e.g., routers, switches, gateways, etc.) that are not shown. In addition, the internal networks 118 are connected to an external network 130 (e.g., the Internet or another public data network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 134 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the data storage service). In addition, one or more of the other computing systems may be archival storage systems (e.g., as part of a remote network-accessible storage service) with which the data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems 122 may further be interconnected with one or more other networks or other connection mediums, such as a high-bandwidth connection over which the storage systems 122 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 1 has been simplified for the purposes of explanation, and that the number and organization of host computing systems, server data storage systems and other devices may be much larger than what is depicted in FIG. 1. For example, as one illustrative embodiment, there may be thousands of computing systems per data center, with at least some of those computing systems being host computing systems that may each host fifteen virtual machines or more, and/or with some of those computing systems being data storage systems that may each store several volume copies. If each hosted virtual machine executes one program, a data center may execute as many as tens of thousands of program copies at one time. Furthermore, hundreds or thousands (or more) of volumes may be stored on the server data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 1 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional storage devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 1, for example, a customer can make a Web service call into an appropriate API of a Web service layer of the system to provision a data volume and attach that volume to a data instance for that customer. The management system can be thought of as residing in a control plane, or control environment, with the data volumes and storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a storage system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

As part of the processing for a customer application, for example, at least some of these resources (as well as potentially external resources) can generate data that is to be stored by one or more data resources in the resource provider environment. This can include customer data or result data, but can also include other types of data such as state or log data. The log data can relate to activities performed by these resources, as well as to provide records of information such as processor utilization, latency values, request counts, memory usage, transaction volumes, error rates, and the like. Each of these resources can send data along one or more data streams to be received to a (logically) centralized location for storage by the appropriate data resource(s).

Figure 2:
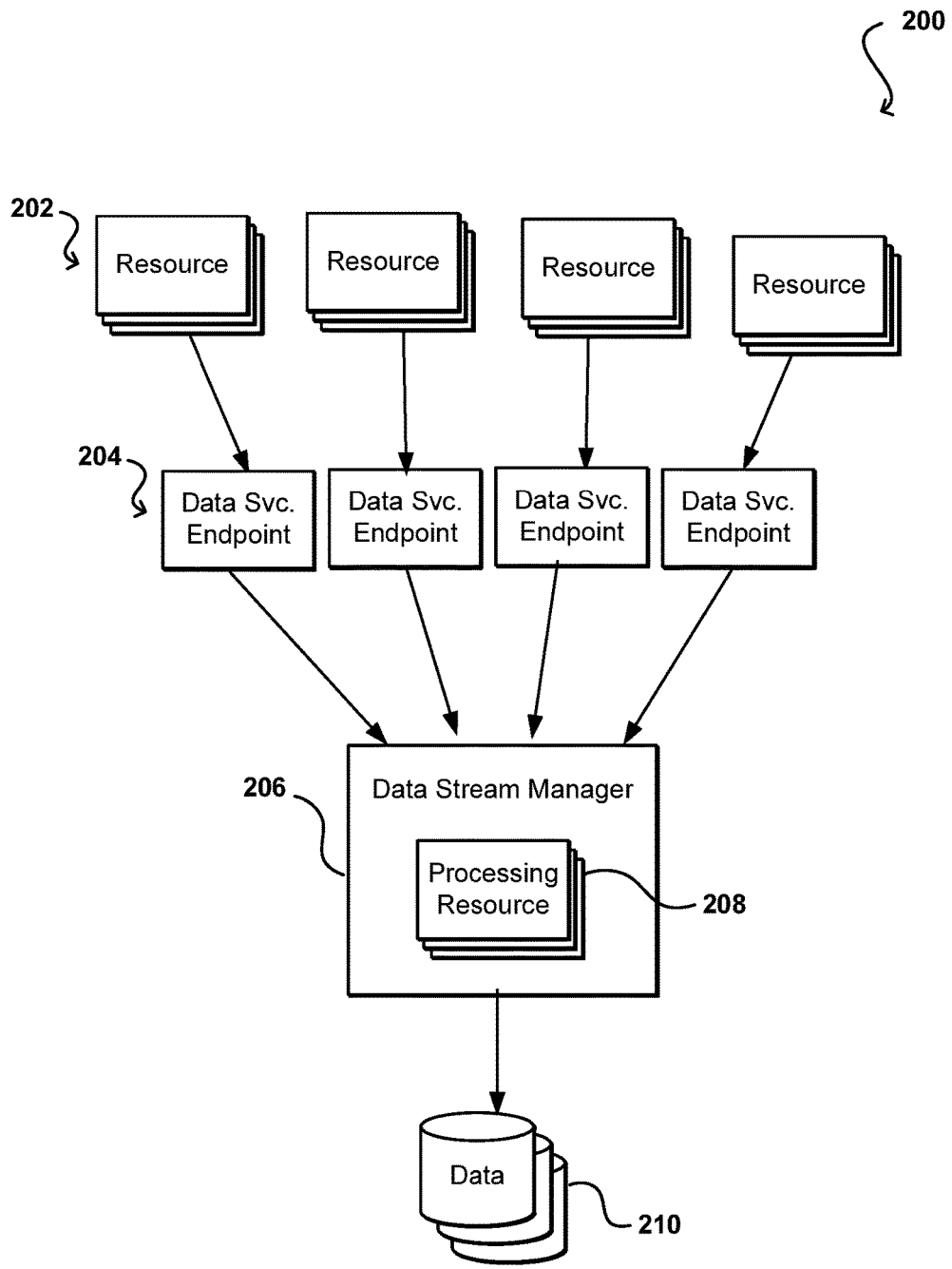
FIG. 2 illustrates components of data stream management architecture that can be utilized in accordance with various embodiments.

FIG. 2 illustrates an example data storage architecture 200 that can be utilized to store these and other types of data in accordance with various embodiments. In this example, there are various resources 202 that each generate data to be stored by one or more data resources 210 in a resource provider environment, or other such multi-tenant or shared-resource environment. For various embodiments, aspects of dynamic data tailing can also be used with a single tenancy environment as discussed elsewhere herein. In this example, each resource 202 can be a computing resource, such as a physical or virtual server, executing a copy of a particular application. Other computing devices executing other types of code can be utilized as well. The resources 202 can each send their data to a respective data service endpoint 204, such as a front end for a data service, designated application programming interface (API), or other such mechanism. In some embodiments, a pool of front end hosts will be provided as endpoints and the respective endpoint for a resource can be determined using a load balancer or other such mechanism. The data streams received to the endpoints 204 can be directed to a data stream manager 206, which can temporarily cache the data until the data can be processed by one or more appropriate processing resources 208. The processing resources 208 can perform tasks on the data, such as to format, transform, aggregate, order, or otherwise process the data such that the data can be stored to one or more appropriate data resources 210, such as may correspond to one or more data hosts. The processing resources can be part of the data stream manager 206 and/or associated with an external system, service, or application, among other such options.

The data stream manager 206 in one embodiment comprises a platform for streaming data using Web services, such as Amazon Kinesis, which provides for the loading of data from multiple streams into data repositories and provides for real time analysis of the received data. The manager can continually collect, store, and process very large amounts of streaming data, such as several terabytes per hour or more. Such a platform can also provide the ability for customers to generate custom applications to generate, process, and/or analyze the streaming data. The ability to process such data streams provides functionality such as to perform multi-stage processing, custom stream partitioning, real time metering, and durable storage for data in transit, among others. The data service endpoints 204 can comprise front ends or interfaces for a data service, such as Amazon CloudWatch. Such a service can provide for monitoring of the various resources 202 to obtain information as discussed above, with the resources then sending streams of log data that can be received to the data stream manager for transformation and storage into the appropriate data repositories 210. The log data transmitted from the resources can be sent in small batches and in near real time. While in some embodiments each log or data record can be sent in real time as it is generated or updated, in other embodiments the data will be batched in small batches based on time, size, number, or another such criterion and transmitted in batches for processing. Such an approach can add a small amount of latency but can also significantly reduce overhead and processing capacity utilization.

Figure 3A:
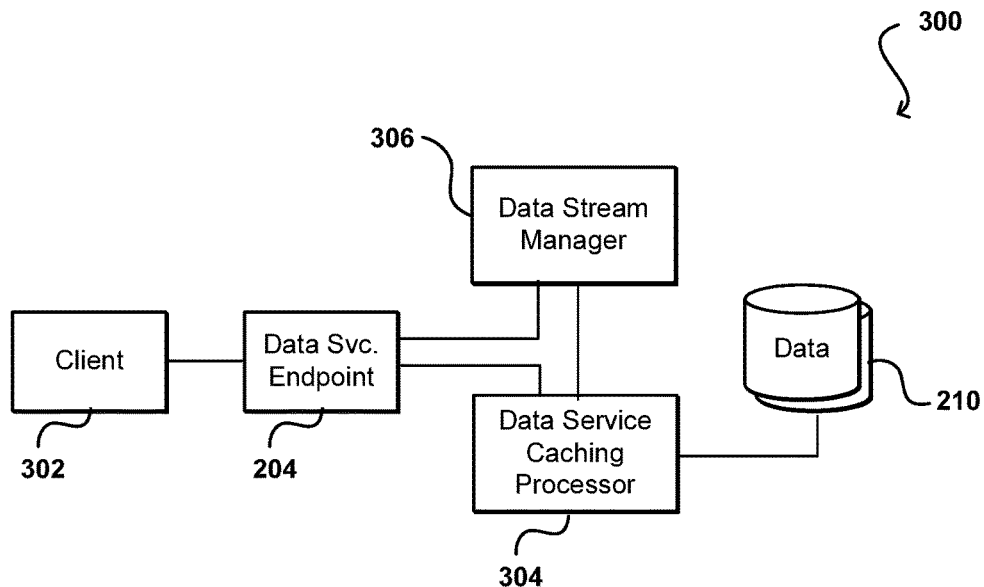
FIGS. 3A and 3B illustrates example configurations for obtaining data from a data stream management architecture that can be utilized in accordance with various embodiments.

Once the data, such as log data, is received and stored in the appropriate data repositories 210, a customer with sufficient permission will be able to access the data. This can be desirable for many customers as the data can be streamed from multiple sources but then available from a single source through the appropriate interface. FIG. 3A illustrates one example configuration 300 wherein a client device 302 is able to communicate with a data service endpoint 204, or other front end, to obtain the data of interest. It should be noted that reference numbers for similar elements may be carried over between figures for simplicity of explanation but that such usage should not be interpreted as a limitation on the scope of the various embodiments unless otherwise specifically stated. In order to obtain the data from the appropriate repository, the client device 302 can submit a request to obtain a log tail that can be received by the appropriate endpoint 204 or front end. The endpoint 204 can cause a call to a PUT log event that is processed by a caching processor 304 for the data service. The data, which was processed by the data stream manager 306 and written to the repository 210, can be returned to the client device 302 using a GET log event that is processed by the caching processor 304. The process of identifying the appropriate host storing the data, querying the host, and receiving back the data results in an amount of latency that may be undesirable for at least some applications, as it does not provide the data in near real time. Thus, some adjustments will be unable to be made as a result of the latency that could otherwise improve performance or allow for various tasks to be performed as needed. Further, there is additional resource cost in performing the querying and processing.

Figure 3B:
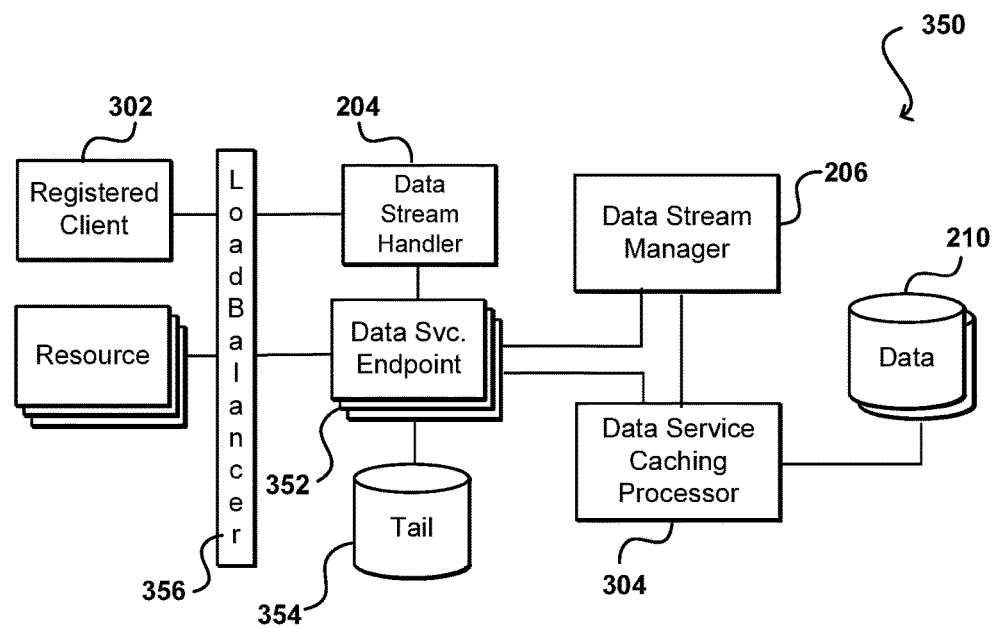

Accordingly, approaches in accordance with various embodiments can attempt to bypass at least a portion of this functionality in order to significantly reduce the latency and cost of obtaining the data. FIG. 3B illustrates an example configuration 350 wherein the client device 302 is able to communicate with a data service endpoint to submit a tail request, which causes the endpoint to function as a handler for the data stream. In this example the handler 204 is one of a set of endpoints that is selected for the request by a load balancer 356, whereby that handler will serve as the tail interface for that client request. The data received on the stream can be forwarded to the handler 204 and related to the client device 302 (or another identified destination) in near real time and without a significant portion of the latency discussed above. The processing of the data can be performed by the data stream manager 206 and/or data service caching processor 304 as discussed above, but such an approach does not require the tail data to undergo this processing before being directed to the client device 302. Instead, a copy of the received data can be generated and directed to the client device as the data is received by the other data service endpoints 352 but before the data passes to the data stream manager 206. The data can be ingested and durably preserved using the same mechanism while a separate mechanism is used to cause a separate copy of the data to be forwarded to the handler 204 responsible for serving the tail command. Such an approach enables the client device 302 to obtain updates or appendings of the data in near real time as they are being written to the data repositories 210. As mentioned, this allows for functionality such as determining in near real time the impact of any adjustments made to the host servers or other resources from which the data is received.

The client device 302 in one embodiment opens a connection to the data stream handler 204, which can be selected by the load balancer 356 based on current load or other such criteria. The client device 302 can also submit a request to tail a data stream, such as a log stream received to the data stream manager 206. The request can specify a particular stream or set of streams, or the stream(s) can be determined automatically based upon the permissions or role of the client device, among other such options. In this example, the handler 204 receiving the request can process the request to determine the appropriate stream(s), and can cause an appropriate pointer, or set of pointers, to be placed in a tail repository 354 or other such data store, database, or distributed memory cache. The pointer, which can also be a record, file, or other data entry, can specify information for the host corresponding to the data stream handler 204, for example, as well as the stream or set of streams for which a tail command is to be executed. The pointer can also specify one or more filter criteria as discussed elsewhere herein. When a PUT log event is received for one of the endpoints 352, the endpoint (or host providing the endpoint) can interrogate the distributed cache 354 to determine whether there are any tails for the respective data stream. If so, the data from the PUT event is forwarded to the handler 204 running the tail through an internal API, for example. The data stream handler 204 can then pass the data to the client device 302 in a stream fashion.

In order to provide advantages of low cost and low latency, such an approach can be "best effort" such that delivery of the tail data is not guaranteed. For example, the client device 302 may not be able to consume the tail data as quickly as it is received and directed to the client device. While the handler 204 may provide some amount of buffering, it is possible that the client device 302 may still get overwhelmed at certain times. In this approach the excess data might get dropped and not received or processed by the client device 302 as part of the tail data. For many implementations, however, the tail data is not intended to be a complete and accurate copy of the data but a reasonable indication or overview of the data, such that the best effort approach is acceptable. Further, the data forwarded to the client device might have an order that is different from the order to which it is to be stored to the durable repository 210. The full data will still be available via the conventional approach through the caching processor, but a reasonable amount of the data will be able to be obtained more quickly. Such an approach can thus provide for near real time sampling in order to be able to monitor the health of the various resources or perform other such tasks.

In at least some embodiments the tail request can also specify one or more filters, rules, or other criteria for forwarding data on a specified data stream. Example filters can specify types of data, error codes, source addresses, response codes, identifiers, data including specific keywords or amounts, and the like. When a PUT request is received to a host or endpoint, the endpoint can consult the pointer in the distributed cache 354 to determine whether there are any filters to apply. The filter can be applied to the data received on the stream, and any corresponding data can be transmitted to the handler 204 serving the tail request for transmission to the client device 302. Instead of receiving all data on a stream, this enables the client device to only receive specific types of data, such as data detected for errors or bugs in the relevant application(s). Further, the client can receive data for only certain topics, from certain users, or any other subset of interest that can be specified by the relevant filter(s), etc. In some embodiments the filters can also include regular expressions or other formula that when satisfied can cause data to be transmitted to the tail host. In one example, a client device can set up a filter to forward data for any account opened over a certain dollar amount or to deactivate an existing account. Various combinations of filters can be specified as well, and data can be transmitted that satisfies any or all of those filters. In implementations where there are large amounts of data, a bloom filter or other such filter can be placed on the endpoints or front end hosts to automatically pick a subset of the data for transmission to the client device under a representative sampling approach.

Figure 4:
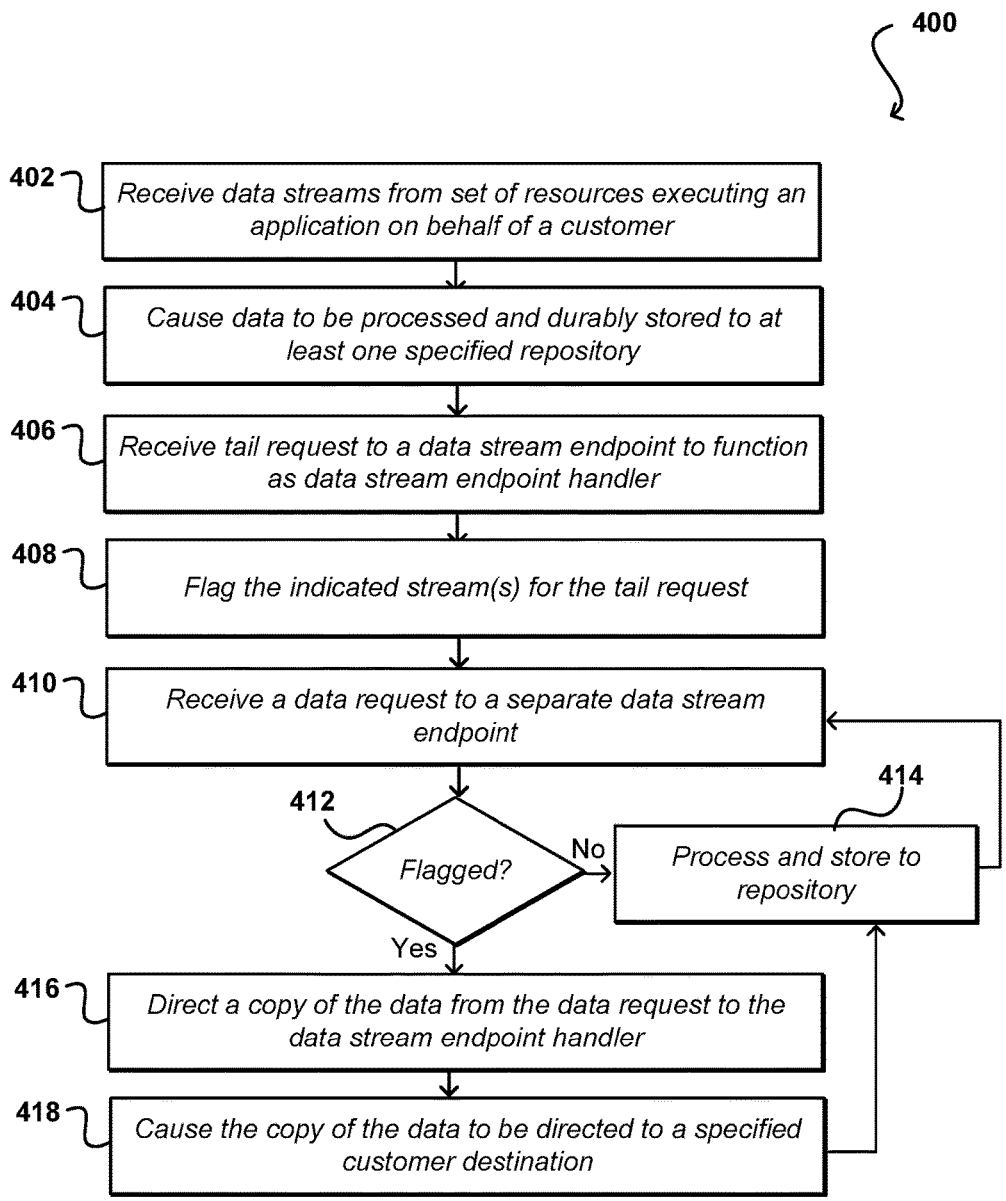
FIG. 4 illustrates an example process for tailing data streams that can be utilized in accordance with various embodiments.

FIG. 4 illustrates an example process 400 for tailing data streams that can be utilized in accordance with various embodiments. It should be understood for the various processes described herein that additional, fewer, or alternative steps can be performed in similar or alternative orders, or in parallel, within the scope of the various embodiments unless otherwise stated. In this example, a number of data streams is received 402 from a set of resources executing an application on behalf of a customer. Each data stream can include information resulting from the application executing on each resource, as may include monitoring data for operation of that server, among other such options. The data streams can be received to front ends or endpoints of a data management service, for example, where the front ends are assigned by a load balancer or other such mechanism. The data from the streams can then be caused 404 to be processed and durably stored to at least one specified repository, as may be offered using one or more data resources of a multi-tenant environment. Various other processing of the data can be performed as well as discussed and suggested elsewhere herein.

A customer or other entity associated with the data stream might want to set up a data tail such that data is transmitted to the customer as soon as it is received via one of the data streams. Accordingly, a tail request is received 406 to a first data stream endpoint, which will function as a data stream handler, where the handler can be selected by the load balancer in at least some embodiments. A connection between the data stream handler and an identified destination for the tail data can then be established in at least some embodiments. In response to the request, a flag can be set 408 for each data stream indicated by the tail request. This can include, for example, any stream associated with a specific application and customer, or a specifically identified stream, among other such options. Subsequently, a data stream can be received 410 to a separate data stream endpoint. This can include, for example, a PUT request being received from a server executing on behalf of the customer, and the load balancer directing the PUT request to a selected host or endpoint. A determination can be made 412 as to whether a flag has been set for that particular stream. This can include, for example, attempting to locate a flag, pointer, or other indicator in a local cache or other such location that is associated with the stream. If a flag is set for the received stream, a copy of the data from the PUT request (or other data request) can be directed 416 to the handler for the tail request. The copy of the data can then be caused 418 to be directed to a customer destination specified by the tail request. Whether or not the data for the request corresponds to a tail request, the data can be processed 414 and stored to the repository as discussed previously. The durably stored data can also be accessible after a period of time. The tail data can be delivered in near real time but may not be a complete and accurate representation of the data, while the durably stored data will be accurate but available only after a period of time necessary for the processing and storage of the data.

Figure 5:
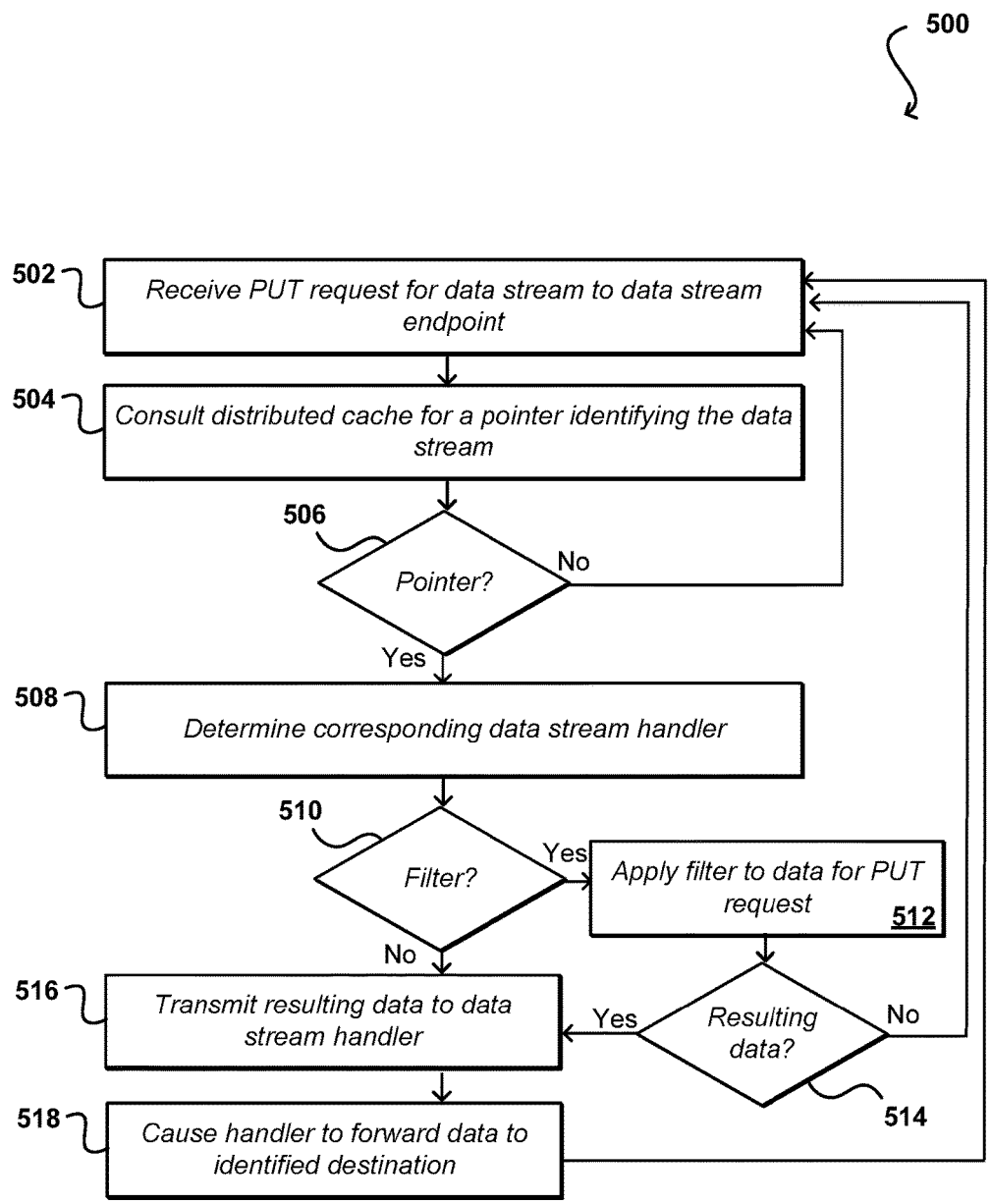
FIG. 5 illustrates an example process for identifying data corresponding to a tail request that can be utilized in accordance with various embodiments.

FIG. 5 illustrates an example process 500 for identifying data corresponding to a tail request that can be utilized in accordance with various embodiments. In this example a PUT or other write request for a data stream is received 502 to a data endpoint. As discussed, this can be one of a set of endpoints as selected by a load balancer or other such mechanism. In response to the request, a distributed cache can be consulted 504 to attempt to locate a pointer, or other identifier, identifying the data stream for which the request was received. If it is determined 506 that no such pointer exists, then the tailing process will not be applied to the request and any other processing for the request can occur. If, however, a pointer is located that is relevant to the stream, then an identity of a handler registered for the stream can be determined 508, where the handler can execute the corresponding endpoint or front end for the data management service. In addition to the host identifier and stream identifier, the pointer can be analyzed to determine 510 whether one or more filters (or rules, etc.) are to be applied to the data stream. The filters can include any appropriate filters as discussed elsewhere herein, as may relate to specific keywords, codes, identifiers, data types, sources, and the like. Any specified filter(s) can be applied 512 to the data for the PUT request. If no data satisfies the filter then no further tail processing may occur for this data. If it is determined 514 that at least some of the data for the PUT request satisfies the filter(s) then a copy of the resulting data is transmitted 516 to the handler and the handler can be caused 518 to forward the data to the identified destination. The process can then continue for subsequent requests.

In addition to simply transmitting the relevant data, additional processing or offerings can be available as well. For example, some embodiments may provide graphing or reporting options that can generate content based on the identified data. Some embodiments can analyze the data to provide near real time statistics or analytics. Other values can also be provided, such as value averages or ranges. Various types of analysis can be performed, although more complicated or robust calculations can take some amount of resource and processing that may impact the real time nature of the data. As mentioned, the data can still be durably stored to persistent storage such that more robust analysis can be performed on the data in persistent storage.

Figure 6:
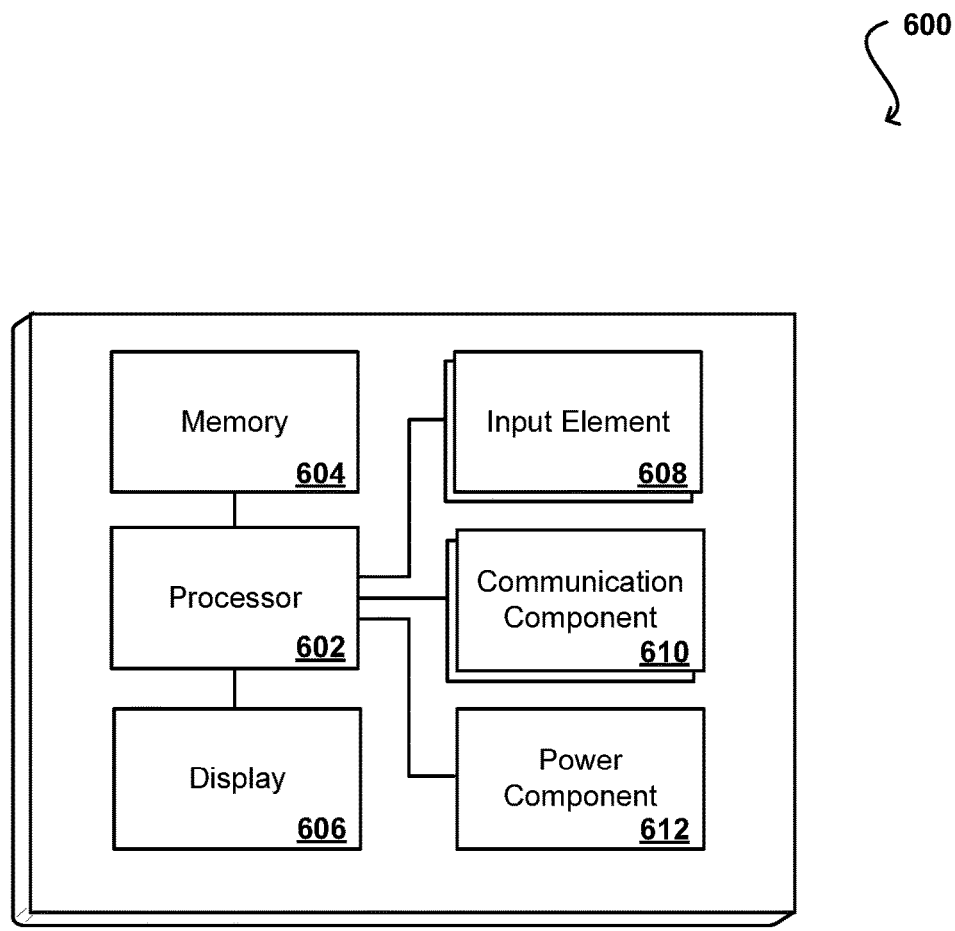
FIG. 6 illustrates components of an example computing device that can be used to perform aspects of the various embodiments.

FIG. 6 illustrates a logical arrangement of a set of general components of an example computing device that can be used to implement aspects of the various embodiments. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device may include some type of display element 606, such as a touch screen or liquid crystal display (LCD), although devices such as portable media players might convey information via other means, such as through audio speakers. In some embodiments, the computing device 600 can include one or more networking and/or communication elements 608, such as a Wi-Fi, Bluetooth, RF, wired, or wireless communication system. The device in many embodiments can communicate with a network, such as the Internet, and may be able to communicate with other such devices. In some embodiments the device can include at least one additional input component 610 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 612, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request for recent data in a stream of log data, the log data generated by a plurality of resources executing an application associated with a customer of data management service;
   registering the request for recent data with a data stream handler of the data management service;
   receiving, to a data stream endpoint of the data management service and from one of the plurality of resources, a write request including log data for the stream, the log data to be processed by a data stream manager of the data management service and stored to a persistent data repository;
   determining that the request for recent data is registered for the stream by the data stream handler;
   determining at least one filter specified by the request for recent data;
   applying the at least one filter to the log data to identify any selected log data from the write request;
   transmitting a copy of the selected log data from the data stream endpoint to the data stream handler; and
   causing the copy of the selected log data to be transmitted from the data stream handler to a target destination specified by the request for recent data, wherein the copy of the selected log data is transmitted to target destination without first waiting for processing by the data stream manager and storage of the selected log data to the persistent data repository.

2. The computer-implemented method of claim 1, further comprising:
   registering the request for recent data by placing a pointer in a distributed cache accessible by a plurality of endpoints including the data stream handler and the data stream endpoint, the pointer identifying at least the stream of log data, the data stream handler, and the at least one filter.

3. The computer-implemented method of claim 1, further comprising:
   writing the log data, after processing, to the persistent data repository, wherein the target destination is enabled to obtain at least a subset of the log data via the request and a larger set of the log data from the persistent data repository, the larger set of log data available from the redundant data repository after a period of latency.

4. The computer-implemented method of claim 1, further comprising:
   receiving the log data for the stream from the plurality of resources over a plurality of connections to at least the data stream endpoint; and
   causing the selected log data for the plurality of resources to be transmitted to the target destination over a single connection from the data stream handler.

5. The computer-implemented method of claim 1, further comprising:

discarding any of the copy of the selected log data that is unable to be delivered to the target destination, the copy of the selected log data for the request for recent data not being guaranteed for delivery to the target destination.

6. A computer-implemented method, comprising:
receiving, to a data endpoint of a data management service, a write request to write data to the data management service, the data associated with a data stream from one or more computing resources;
determining that a handler of the data management service is registered for the data stream;
transmitting a copy of at least a subset of the data for the write request from the data endpoint to the handler;
causing the copy to be transmitted from the handler to a specified destination external to the data management service; and
storing the data to the data management service, wherein the target destination is enabled to receive at least the subset of the data from the handler and a larger copy of the data from the data management service, the larger copy available after a period of processing latency of the data management service.

7. The computer-implemented method of claim 6, further comprising:
receiving a request for recent data from a client device associated with a customer of the data management service, the request for recent data specifying the data stream;
selecting the handler from a plurality of endpoints of the data management service; and
registering the handler for the data stream.

8. The computer-implemented method of claim 7, further comprising:
verifying that the customer is authorized to receive the data for the data stream before registering the handler.

9. The computer-implemented method of claim 7, further comprising:
registering the handler by placing a pointer in a distributed cache accessible by the plurality of endpoints, the pointer specifying at least the data stream and the handler.

10. The computer-implemented method of claim 6, further comprising:
determining a filter or transformation to be applied to the data received for the write request; and
determining at least the subset of the data for the copy by applying the filter or transformation to the data.

11. The computer-implemented method of claim 10, wherein the filter specifies at least one of a keyword, an identifier, a regular expression, a source, a sampling criteria, or an aspect of the data.

12. The computer-implemented method of claim 6, further comprising:
performing analysis on the copy of at least the subset of the data; and
transmitting a result of the analysis with the copy to the target destination, wherein the target destination is enabled to receive the result independent of any latency associated with processing and storage of the data by the data management service.

13. The computer-implemented method of claim 6, further comprising:
applying a bloom filter to the data received for the data stream in order to provide a sampling of the data to the target destination.

14. The computer-implemented method of claim 6, further comprising:
processing, via the data management service, the data before storing the data to the data management service, the processing including at least one of a formatting or transformation of the data.

15. A system, comprising:
at least one processor; and
memory including instructions that, when executed by the at least one processor, cause the system to:
receive, to a data endpoint of a data management service, a write request to write data to the data management service, the data associated with a data stream from one or more computing resources;
determine that a handler of the data management service is registered for the data stream;
transmit a copy of at least a subset of the data for the write request from the data endpoint to the handler;
cause the copy to be transmitted from the handler to a specified destination external to the data management service; and
store the data to the data management service, wherein the target destination is enabled to receive at least the subset of the data from the handler and a larger copy of the data from the data management service, the larger copy available after a period of processing latency of the data management service.

16. The system of claim 15, wherein the instructions when executed further cause the system to:
receive a request for recent data from a client device associated with a customer of the data management service, the request for recent data specifying the data stream;
select the handler from a plurality of endpoints of the data management service; and
register the handler for the data stream.

17. The system of claim 16, wherein the instructions when executed further cause the system to:
register the handler by placing a pointer in a distributed cache accessible by the plurality of endpoints, the pointer specifying at least the data stream and the handler.

18. The system of claim 16, wherein the instructions when executed further cause the system to:
process, via the data management service, the data before storing the data to the data management service, the processing including at least one of a formatting or transformation of the data.

19. The system of claim 15, wherein the instructions when executed further cause the system to:
determine at least one filter to be applied to the data received for the write request; and
determine at least the subset of the data for the copy by applying the at least one filter to the data.

20. The system of claim 15, wherein the instructions when executed further cause the system to:
perform analysis on the copy of at least the subset of the data; and
transmit a result of the analysis with the copy to the target destination, wherein the target destination is enabled to receive the result independent of any latency associated with processing and storage of the data by the data management service.

* * * * *